(12) United States Patent
Yang

(10) Patent No.: US 9,201,509 B2
(45) Date of Patent: Dec. 1, 2015

(54) CHARACTER INPUT METHOD AND DEVICE BASED ON ARROW KEY

(71) Applicant: Huawei Technologies Co., Ltd., Shenzhen, Guangdong (CN)

(72) Inventor: Wenting Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 14/143,445

(22) Filed: Dec. 30, 2013

(65) Prior Publication Data

US 2014/0111434 A1   Apr. 24, 2014

Related U.S. Application Data

(63) Continuation of application No. PCT/CN2011/078979, filed on Aug. 26, 2011.

(51) Int. Cl.
  *G06F 3/033*  (2013.01)
  *G06F 3/023*  (2006.01)
  *G06F 3/00*   (2006.01)
  *G06F 3/01*   (2006.01)

(52) U.S. Cl.
  CPC .............. *G06F 3/0236* (2013.01); *G06F 3/005* (2013.01); *G06F 3/018* (2013.01); *G06F 3/0234* (2013.01); *G06F 3/0237* (2013.01)

(58) Field of Classification Search
  CPC ....... G06F 3/005; G06F 3/0234; G06F 3/018; G06F 3/0237; G06F 3/0236; G06F 3/023; G06F 3/01

USPC .................................................. 345/156–174
See application file for complete search history.

(56) References Cited

U.S. PATENT DOCUMENTS

| | | | |
|---|---|---|---|
| 6,765,556 B2 * | 7/2004 | Kandogan et al. ............. | 345/168 |
| 7,710,292 B2 * | 5/2010 | Davies ............................ | 341/22 |
| 7,755,520 B2 * | 7/2010 | Kandogan et al. ............. | 341/22 |
| 2004/0243746 A1 | 12/2004 | Wong | |
| 2012/0188168 A1 | 7/2012 | Yoon | |

FOREIGN PATENT DOCUMENTS

| | | | |
|---|---|---|---|
| CN | | 1529530 A | 9/2004 |
| CN | | 1581029 A | 2/2005 |
| CN | | 1584797 A | 2/2005 |
| CN | | 1936787 A | 3/2007 |
| WO | WO 2011/010835 A2 | | 1/2011 |

* cited by examiner

*Primary Examiner* — Vijay Shankar

(57) ABSTRACT

A character input method and device based on an arrow key are provided. The method of the present invention includes: querying a letter database according to triggering of a arrow key and obtaining a letter set corresponding to the arrow key; arranging the letter set corresponding to the arrow key according to a predetermined rule, and partially or fully spreading and then displaying the letter set in a display region; displaying a selection cursor at a default position in the display region, where the selection cursor is used for identifying a currently selected letter; and inputting the letter identified by the selection cursor into a character input region according to a predetermined selection rule. Embodiments of the present invention are mainly applied to a character input process based on an arrow key.

26 Claims, 9 Drawing Sheets

↑ : f(Top point), i(Top point), j(Top point), t(Top point), u(Upward Opening), v(Upward opening), w(Upward opening)

↓ : h( Downward opening ), m( Downward opening ), n( Downward opening)

← : a(Leftward arc/opening), d(Leftward arc), g(Leftward arc/opening), q(Leftward arc), y(Leftward opening), z(Leftward opening)

→ : b(Rightward arc), c(Rightward opening), e(Rightward arc/opening), k(Rightward opening), p(Rightward arc), r(Rightward opening)

● : l(Symmetrical), o(Symmetrical), s(Symmetrical), x(Symmetrical)

FIG. 3

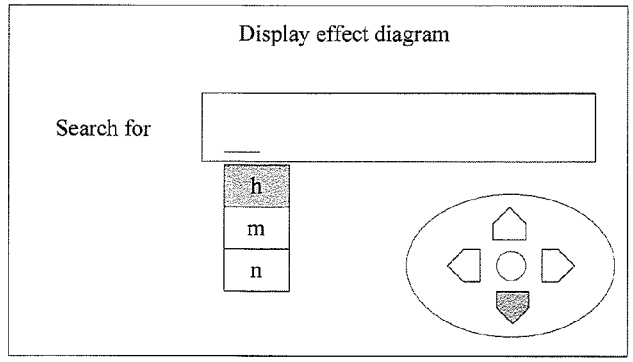

FIG. 4

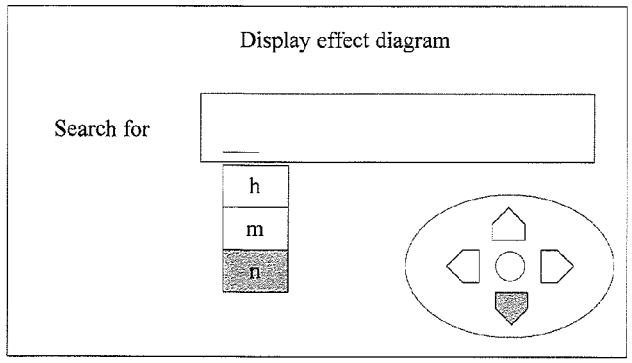

FIG. 5

CHARACTER INPUT METHOD AND DEVICE BASED ON ARROW KEY

CROSS-REFERENCE TO RELATED APPLICATIONS

This application is a continuation of International Application No. PCT/CN2011/078979, filed on Aug. 26, 2011, which is hereby incorporated by reference in its entirety.

TECHNICAL FIELD

The present invention relates to the field of terminal technologies, and in particular, to a character input method and device based on an arrow key.

BACKGROUND

With the development of digital technologies, more and more functions and application types of a terminal equipment emerge, where character input, as an important auxiliary function, is widely used among multiple terminals and applications. However, in order to improve the performance and reduce the number of keys of the terminal equipment, generally, only arrow keys and few other keys are provided on an input terminal, so character input is implemented mainly through the arrow keys on such a terminal.

Currently, a frequently used character input method based on an arrow key is: selecting a character by moving a cursor. Specifically, a soft keyboard including 26 letters is presented on a display, and one cursor is provided at a default position for identifying a currently selected letter on the soft keyboard; the cursor is correspondingly moved according to triggering of four arrow keys, namely, an up arrow key, a down arrow key, a left arrow key and a right arrow key; and the letter at the cursor position is input into a text when triggering of a determined key is received.

The prior art has the following disadvantages: when a character is selected by moving a cursor through an arrow key and when the cursor is moved, it is required to perform repeated switching among all the arrow keys and to move the cursor back and forth, resulting in complex operation of the character input and low input efficiency, thereby reducing the user experience.

SUMMARY

Embodiments of the present invention provide a character input method and device based on an arrow key, which can simplify the character input operation and improve the input efficiency and the user experience.

A character input method based on an arrow key includes:
 querying a letter database according to triggering of an arrow key and obtaining a letter set corresponding to the arrow key;
 arranging the letter set corresponding to the arrow key according to a predetermined rule, and partially or fully spreading and then displaying the letter set in a display region;
 displaying a selection cursor at a default position in the display region, where the selection cursor is used for identifying a currently selected letter; and
 inputting the letter identified by the selection cursor into a character input region according to a predetermined selection rule.

A character input interface based on an arrow key includes:
 when the character input interface is triggered through an up arrow key, arranging and displaying a letter set corresponding to the up arrow key in a direction from bottom to top, and displaying a letter selection cursor at a default position;
 when the character input interface is triggered through a down arrow key, arranging and displaying a letter set corresponding to the down arrow key in a direction from top to bottom, and displaying a letter selection cursor at a default position;
 when the character input interface is triggered through a left arrow key, arranging and displaying a letter set corresponding to the left arrow key in a direction from left to right, and displaying a letter selection cursor at a default position; and
 when the character input interface is triggered through a right arrow key, arranging and displaying a letterset corresponding to the right arrow key in a direction from right to left, and displaying a letter selection cursor at a default position.

A character input device based on an arrow key includes:
 an obtaining unit, configured to query a letter database according to triggering of an arrow key and obtain a letter set corresponding to the arrow key;
 a display unit, configured to arrange the letter set corresponding to the arrow key according to a predetermined rule, and partially or fully spread and then display the letter set in a display region;
 a cursor display unit, configured to display a selection cursor at a default position in the display region, where the selection cursor is used for identifying a currently selected letter; and
 an input unit, configured to input a letter identified by the selection cursor into a character input region according to a predetermined selection rule.

Through the character input method and device based on an arrow key provided by the embodiments of the present invention, the corresponding letter sets can be drawn out according to triggering of different arrow keys. Compared with the method in the prior art that 26 letters are all displayed on the screen, a range of the letter selection is narrowed, and a moving operation of the cursor is reduced and shielding of the screen is avoided. Moreover, the letter sets are displayed in a single-line permutation, so that the cursor only needs to be moved in one direction for letter selection without a need of performing repeated switching among multiple arrow keys or moving the cursor back and forth on a two-dimensional soft keyboard, thereby simplifying the character input operation and improving the input efficiency and user experience.

BRIEF DESCRIPTION OF THE DRAWINGS

To illustrate the technical solutions in the embodiments of the present invention more clearly, the accompanying drawings for describing the embodiments are introduced briefly in the following. Apparently, the accompanying drawings in the following description are only some embodiments of the present invention, and persons of ordinary skill in the art may further derive other drawings according to the accompanying drawings without creative efforts.

FIG. 3 is a letter set classification method in Embodiment 2 of the present invention;

FIG. 4 is a display effect diagram in Embodiment 2 of the present invention;

FIG. 5 is another display effect diagram in Embodiment 2 of the present invention;

DETAILED DESCRIPTION

The technical solutions in the present invention will be clearly and completely described in the following with reference to the accompanying drawings. It is obvious that, the embodiments to be described are only a part rather than all of the embodiments of the present invention. All other embodiments obtained by persons skilled in the art based on the embodiments of the present invention without creative effects shall fall in the protection scope of the present invention.

Embodiment 1

Figure 1:
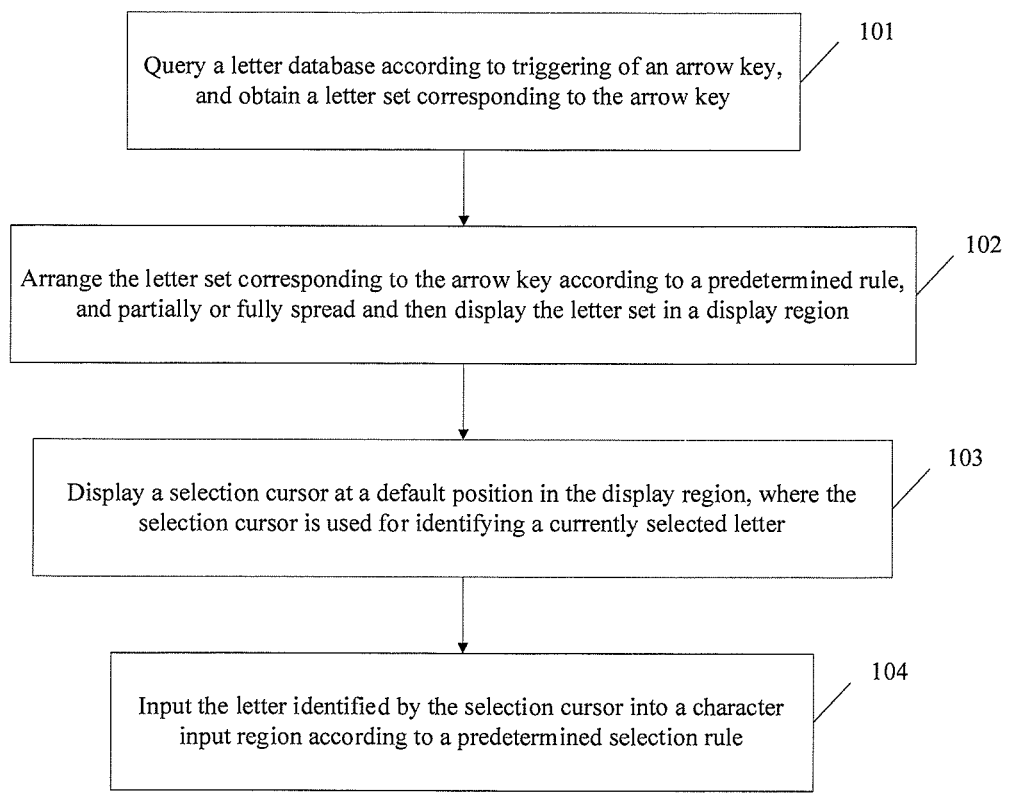
FIG. 1 is a flow chart of a character input method based on arrow keys in Embodiment 1 of the present invention.

An embodiment of the present invention provides a character input method based on an arrow key. As shown in FIG. 1, the method includes the following.

101. Query a letter database according to triggering of an arrow key, and obtain a letter set corresponding to the arrow key.

The letter database is predefined, and the arrow key and the corresponding letter set are included in the letter database.

102. Arrange the letter set corresponding to the arrow key according to a predetermined rule, and partially or fully spread and then display the letter set in a display region.

103. Display a selection cursor at a default position in the display region, where the selection cursor is used for identifying a currently selected letter.

A form of the selection cursor may be a selection frame, or highlighting a current item or showing a current item in bold, and the like. Forms of the selection cursor include, but are not limited to the foregoing forms, and the selection cursor of other forms is not described in detail in the embodiment of the present invention again.

104. Input the letter identified by the selection cursor into a character input region according to a predetermined selection rule.

A method for selecting a letter may be that a cursor is moved by continuously triggering of a same arrow key, or a cursor is moved through a volume key, or a letter is selected through a number key. In the embodiment of the present invention, a method for moving a cursor or selecting a letter includes, but is not limited to, the above method, and other methods for moving a cursor or selecting a letter are not described in detail in the embodiment of the present invention again.

In addition, when the character input method provided by the present invention is set to a Chinese character mode, a terminal may implement the input of Chinese characters according to pinyin input by a user. Specifically, a Chinese character database is queried according to pinyin in the character input region, and a Chinese character corresponding to the pinyin is obtained. The letters in the character input region are deleted and the Chinese character corresponding to the pinyin is input into the character input region.

Through the character input method and device based on an arrow key provided by the embodiment of the present invention, the corresponding letter sets can be drawn out according to triggering of different arrow keys. Compared with the method in the prior art that 26 letters are all displayed on the screen, a range of the letter selection is narrowed, and a moving operation of the cursor is reduced and shielding of the screen is avoided. Moreover, the letter sets are displayed in a single-line arrangement, so that the cursor only needs to be moved in one direction for letter selection without a need of performing repeated switching among multiple arrow keys or moving the cursor back and forth on a two-dimensional soft keyboard, thereby simplifying the character input operation and improving the input efficiency and user experience.

Embodiment 2

Figure 2:
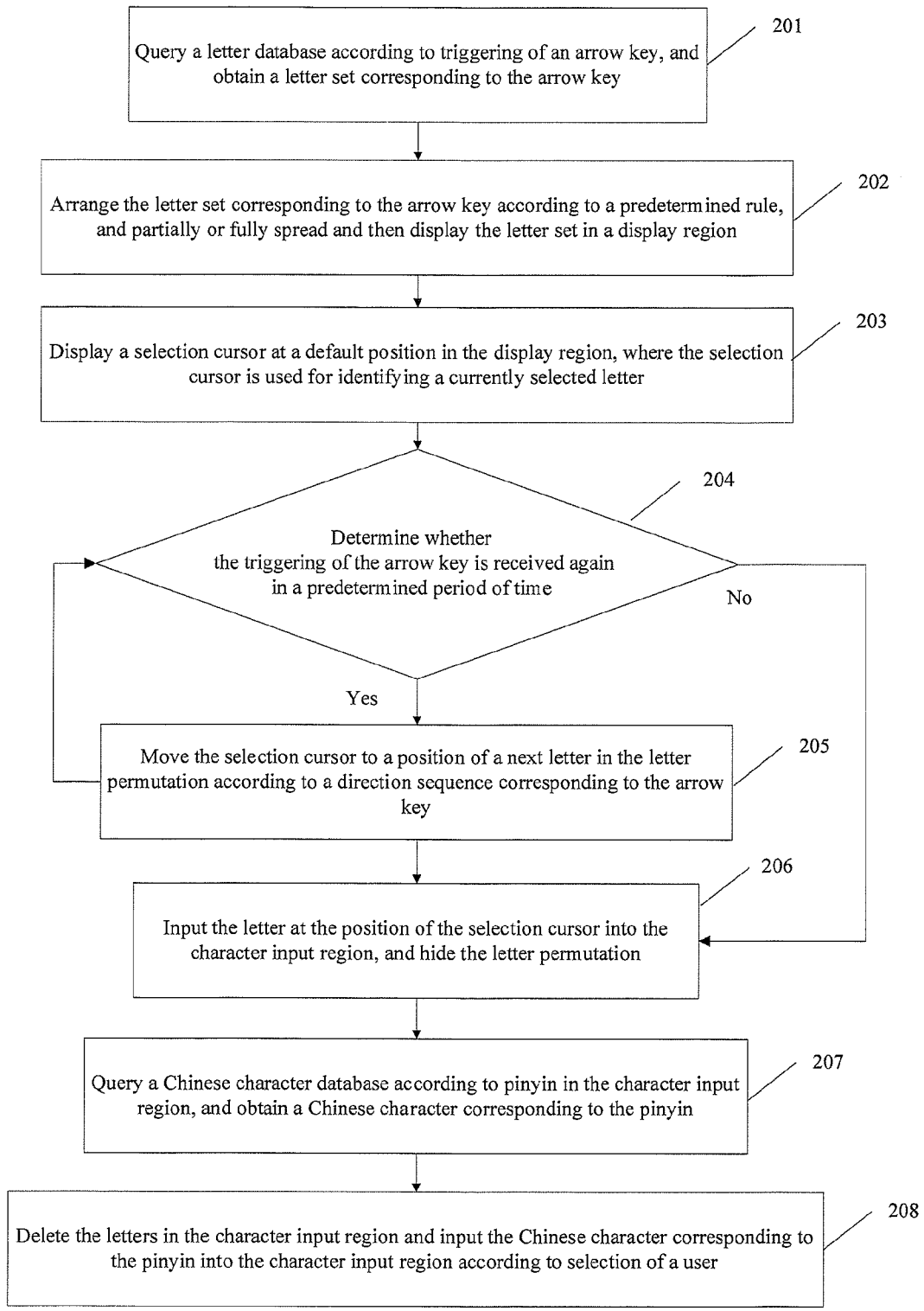
FIG. 2 is a flow chart of a character input method based on arrow keys in Embodiment 2 of the present invention.

An embodiment of the present invention provides a character input method based on an arrow key. As shown in FIG. 2, the method includes the following.

201. Query a letter database according to triggering of an arrow key, and obtain a letter set corresponding to the arrow key.

The letter set corresponding to the arrow key may be formed through predefining, that is, according to the law of human graphical perception and features of geometrical shapes of handwritten letters, the 26 English letters are classified to obtain letter sets with similar features, and the classified letter sets are respectively associated with each arrow key. Specifically, as shown in FIG. 3, according to an intuitive feeling for the graphic direction of human, the handwritten 26 letters are classified according to classification manners such as the opening direction, the arc direction, whether the letter has a top sharp point, and whether the letter is in a symmetrical shape. Since features of geometrical shapes of each letter are different, and one letter may also include multiple features of geometrical shapes, the classification manner is selected for each letter according to the priority principle that the opening direction is superior to the arc direction, the arc direction is superior to the sharp point, and the sharp point is superior to symmetry. For example, since the letter b has both a top sharp point and an arc, the letter b is classified preferentially according to the arc direction and is sorted into a letter set with an arc towards the right. Therefore, a letter classification method shown in FIG. 3 is obtained. A letter set corresponding to an up arrow key includes f, j, t, u, v and w; a letter set corresponding to a down arrow key includes h, m and n; a letter set corresponding to a left arrow key includes a, d, g, q, y and z; a letter set corresponding to a right arrow key includes b, c, e, k, p and r; and a letter set corresponding to a center key includes l, o, s and x. It should be noted that, the letter classification method includes, but is not limited to, the above methods, and other reasonable classification methods may also be applied in the embodiment of the present invention.

The arrow keys include an up arrow key, a down arrow key, a left arrow key, a right arrow key and a center key. It should be noted that, a terminal equipment that may be applied in the present invention includes, but is not limited to, the devices such as an input device for TV remote control, a cell phone or a computer, and any equipment that includes arrow keys and a center key or equipment that is capable of replacing the arrow keys and the center key with other keys may use the character input method of the present invention.

202. Arrange the letter set corresponding to the arrow key according to a predetermined rule, and partially or fully spread and then display the letter set in a display region.

The predetermined rule for arranging the letter set may be that, the letter set is arranged according to a descending sequence of use efficiency of the letters, or sequentially arranged according to a sequence of the letters in the alphabet, or arranged according to a random sequence. The letter set may further be arranged according to other predetermined rules, which are not described in detail in the embodiment of the present invention. When a letter set is displayed, the letter set may be partially or fully displayed in the display region according to a display condition of a character input equipment.

203. Display a selection cursor at a default position in the display region, where the selection cursor is used for identifying a currently selected letter.

In step 202 and step 203, the letter set corresponding to the arrow key is arranged according to a predetermined rule, and is partially or fully spread and then displayed in the display region. The method for displaying the selection cursor at the default position in the display region may be as follows: when the triggering of the arrow key is triggering of the up arrow key, a letter set corresponding to the up arrow key is arranged and displayed in a direction from bottom to top, and the selection cursor is displayed at a position of a first letter from bottom to top. When the triggering of the arrow key is triggering of the down arrow key, a letter set corresponding to the down arrow key is arranged and displayed in a direction from top to bottom, and the selection cursor is displayed at a position of a first letter from top to bottom. When the triggering of the arrow key is triggering of the left arrow key, a letter set corresponding to the left arrow key is arranged and displayed in a direction from left to right, and the selection cursor is displayed at a position of a first letter from left to right. When the trigging of the arrow key is the triggering of the right arrow key, a letter set corresponding to the right arrow key is arranged and displayed in a direction from right to left, and the selection cursor is displayed at a position of a first letter from right to left. When the triggering of the arrow key is triggering of the center key, a letter set corresponding to the center key is arranged and displayed in a clockwise/counterclockwise surrounding manner, and the selection cursor is displayed at a position of a first letter in a clockwise/counterclockwise direction from the point 0.

For example, when the triggering of the down arrow key is received, as shown in FIG. 4, the letter set "h, m, n" corresponding to the down arrow key is arranged and displayed in a direction from top to bottom, and the selection cursor is displayed at the position of the first letter h.

Step 204: Determine whether the triggering of the arrow key is received again in a predetermined period of time; if the triggering of the arrow key is received again in a predetermined period of time, step 205 is performed; if the triggering of the arrow key is not received again in a predetermined period of time, step 206 is performed.

The method for inputting the letter identified by the selection cursor into the character input region according to the predetermined selection rule may be as follows: if the triggering of the arrow key is received again in a predetermined period of time, the selection cursor is moved to a position of a next letter in the letter permutation according to a direction sequence corresponding to the arrow key. If the triggering of the arrow key is not received again in a predetermined period of time, the letter at the position of the selection cursor is input into the character input region, and the letter permutation is hidden. The method for inputting the letter identified by the selection cursor into the character input region according to the predetermined selection rule may also be as follows: the letter identified by the selection cursor is input into the character input region according to a selection instruction. For example, the letter identified by the selection cursor is input into the character input region through the selection instruction such as an acknowledgement key or a number key.

205. Move the selection cursor to a position of a next letter in the letter permutation according to a direction sequence corresponding to the arrow key.

When the selection cursor is located at the position of a last letter in the letter permutation, the next letter is a first letter in the letter permutation, and therefore, it may be implemented that the cursor is circularly moved on the letter permutation through continuously triggering of a same arrow key. Still taking the input state shown in FIG. 4 as an example, in step 203, the corresponding letter permutation is obtained through triggering of the down arrow key and the selection cursor is displayed at the position of the letter h; if the triggering of the down arrow key is received again in a predetermined period of time, the selection cursor is sequentially moved to the position of the next letter m. FIG. 5 shows a position of the selection cursor obtained by receiving the triggering of the down arrow key twice after the display state shown in FIG. 4. At this time, since the selection cursor is located at a position of the last letter in the letter permutation displayed on the screen, when the triggering of the down arrow key is received again, the next letter where the selection cursor is moved is the first letter in the current permutation, that is, the position of the letter h, and then the state shown in FIG. 4 is returned.

206. Input the letter at the position of the selection cursor into the character input region, and hide the letter permutation.

Figure 6:
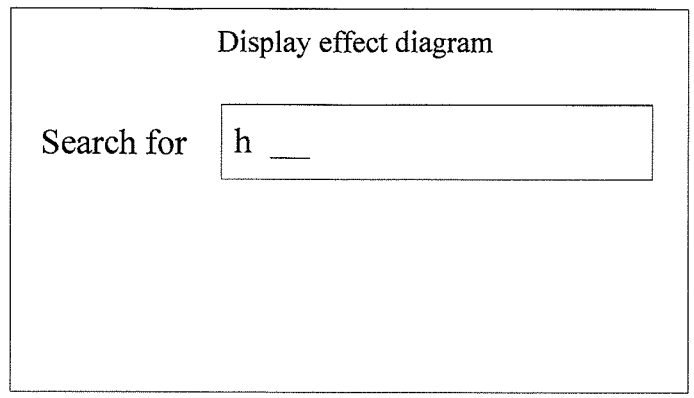
FIG. 6 is another display effect diagram in Embodiment 2 of the present invention.

If the triggering of a same arrow key is not received again in a predetermined period of time, the letter at the position of the selection cursor is input into the character input region, and the letter permutation is hidden. Still taking the input state shown in FIG. 4 as an example, if the triggering of the down arrow key is not received again in the predetermined period of time, the letter h is input into the character input region, and the previously displayed letter permutation is hidden, as shown in FIG. 6.

207. Query a Chinese character database according to pinyin in the character input region, and obtain a Chinese character corresponding to the pinyin.

Figure 7:
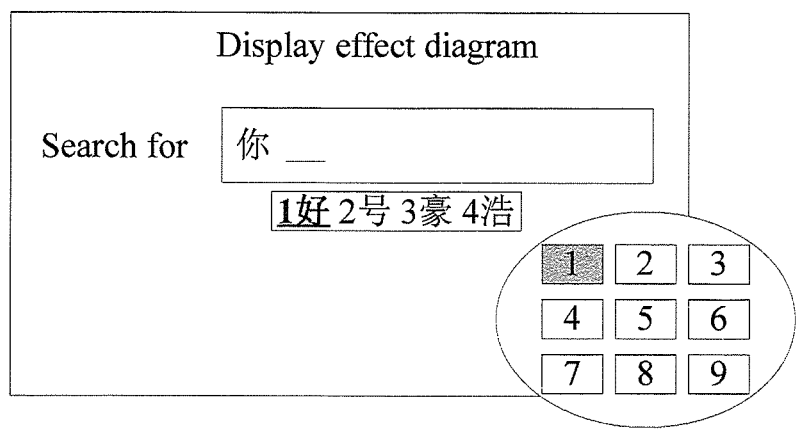
FIG. 7 is another display effect diagram in Embodiment 2 of the present invention.

According to the pinyin that is input into the character input region, a predetermined Chinese character database is queried; a Chinese character set that matches the pinyin is obtained; and the obtained Chinese character set is displayed. For example, as shown in FIG. 7, the Chinese character database is queried according to pinyin "hao" that is input into the character input region, a Chinese character set "好, 号, 豪, 浩" that matches the pinyin "hao" is obtained, and the obtained Chinese character set is displayed according to a predetermined display rule. The specific display rule may be determined according to the specific condition of a display or an input terminal, which is not limited in the embodiment of the present invention.

208. Delete the letters in the character input region, and input the Chinese character corresponding to the pinyin into the character input region according to selection of a user.

According to the selection of the user, one Chinese character selected from the Chinese character set that is obtained in step 207 is input into the character input region, and the matched pinyin in the character region is deleted, and meanwhile, a display column of the Chinese character set is hidden. Still taking the input state shown in FIG. 7 as an example, the Chinese character "好" may be input into the character input region through the number key "1". The method for selecting or inputting the Chinese character includes, but is not limited to, the above method, and may be determined according to the specific condition of an input device, for example, moving the cursor through a volume key, which is not described in detail in the embodiment of the present again.

Through the character input method and device based on an arrow key provided by the embodiment of the present invention, the corresponding letter sets can be drawn out according to triggering of different arrow keys. Compared with the method in the prior art that 26 letters are all displayed on the screen, a range of the letter selection is narrowed, and a moving operation of the cursor is reduced and shielding of the screen is avoided. Moreover, the letter sets are displayed in a single-line arrangement, so that the cursor only needs to be moved in one direction for letter selection without a need of performing repeated switching among multiple arrow keys or moving the cursor back and forth on a two-dimensional soft keyboard, thereby simplifying the character input operation and improving the input efficiency and user experience.

Embodiment 3

An embodiment of the present invention provides a character input interface based on an arrow key, including the following.

Figure 8:
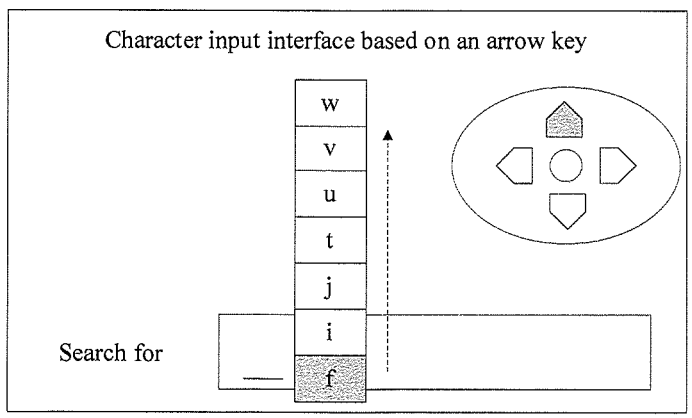
FIG. 8 is a schematic diagram of a character input interface based on arrow keys in Embodiment 3 of the present invention.

As shown in FIG. 8, when the character input interface is triggered through an up arrow key, a letter set corresponding to the up arrow key is arranged and displayed in a direction from bottom to top, and a letter selection cursor is displayed at a default position.

Figure 9:
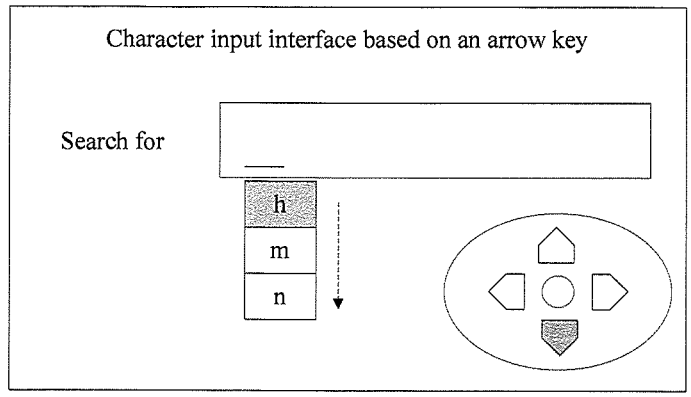
FIG. 9 is another schematic diagram of a character input interface based on arrow keys in Embodiment 3 of the present invention.

As shown in FIG. 9, when the character input interface is triggered through a down arrow key, a letter set corresponding to the down arrow key is arranged and displayed in a direction from top to bottom, and a letter selection cursor is displayed at a default position.

Figure 10:
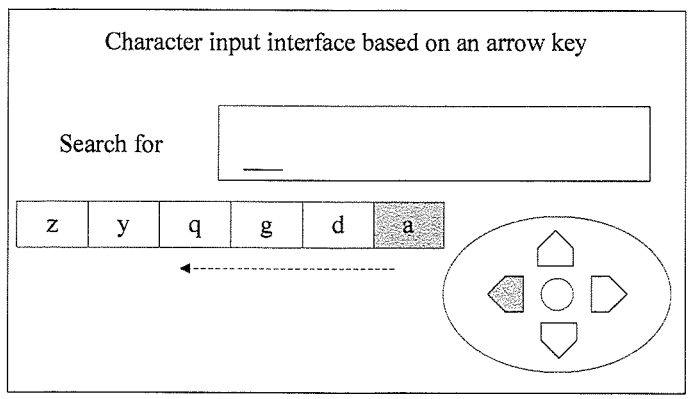
FIG. 10 is another schematic diagram of a character input interface based on arrow keys in Embodiment 3 of the present invention.

As shown in FIG. 10, when the character input interface is triggered through a left arrow key, a letter set corresponding to the left arrow key is arranged and displayed in a direction from left to right, and a letter selection cursor is displayed at a default position.

Figure 11:
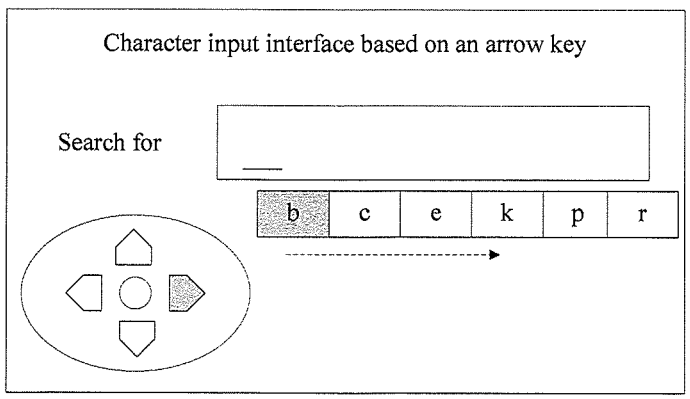
FIG. 11 is another schematic diagram of a character input interface based on arrow keys in Embodiment 3 of the present invention.

As shown in FIG. 11, when the character input interface is triggered through a right arrow key, a letter set corresponding to the right arrow key is arranged and displayed in a direction from right to left, and a letter selection cursor is displayed at a default position.

Figure 12:
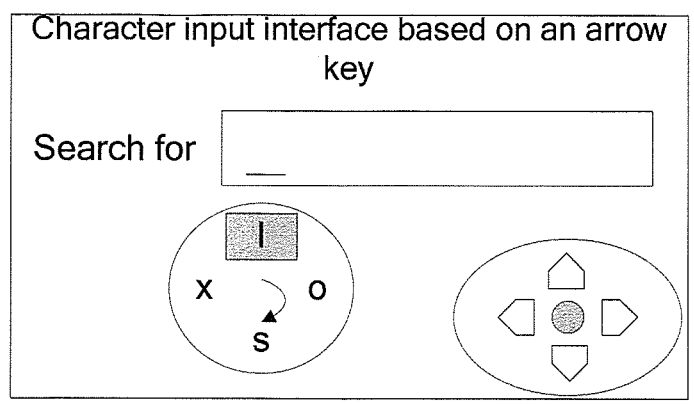
FIG. 12 is another schematic diagram of a character input interface based on arrow keys in Embodiment 3 of the present invention.

As shown in FIG. 12, when the character input interface is triggered through a center key, a letter set corresponding to the center key is arranged and displayed in a clockwise/counterclockwise surrounding manner, and a letter selection cursor is displayed at a default position.

Further, as shown in FIG. 3, in the character input interface based on an arrow key:

a letter set corresponding to the up arrow key includes: f, j, t, u, v and w;

a letter set corresponding to the down arrow key includes: h, m and n;

a letter set corresponding to the left arrow key includes: a, d, g, q, y and z;

a letter set corresponding to the right arrow key includes: b, c, e, k, p and r; and a letter set corresponding to the center key includes: l, o, s and x.

Further, the letter sets corresponding to the up arrow key, the down arrow key, the left arrow key, the right arrow key and the center key are arranged according to a descending sequence of use efficiency of the letters, or sequentially arranged according to a sequence of the letters in the alphabet, or arranged according to a random sequence.

Through the character input method and device based on an arrow key provided by the embodiment of the present invention, the corresponding letter sets can be drawn out according to triggering of different arrow keys. Compared with the method in the prior art that 26 letters are all displayed on the screen, a range of the letter selection is narrowed, and a moving operation of the cursor is reduced and shielding of the screen is avoided. Moreover, the letter sets are displayed in a single-line arrangement, so that the cursor only needs to be moved in one direction for letter selection without a need of performing repeated switching among multiple arrow keys or moving the cursor back and forth on a two-dimensional soft keyboard, thereby simplifying the character input operation and improving the input efficiency and user experience.

Embodiment 4

Figure 13:
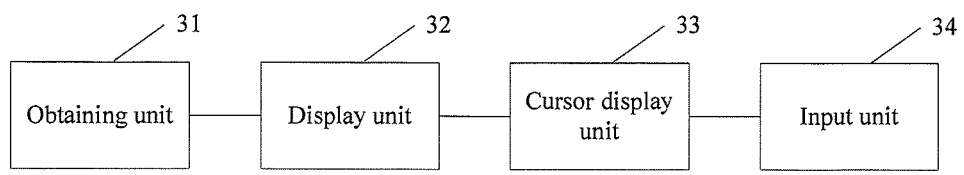
FIG. 13 is a schematic compositional diagram of a character input device based on arrow keys in Embodiment 4 of the present invention.

An embodiment of the present invention provides a character input device based on an arrow key. As shown in FIG. 13, the device includes: an obtaining unit 31, a display unit 32, a cursor display unit 33, and an input unit 34.

The obtaining unit 31 is configured to query a letter database according to triggering of an arrow key and obtain a letter set corresponding to the arrow key.

The display unit 32 is configured to arrange the letter set corresponding to the arrow key according to a predetermined rule, and partially or fully spread and then display the letter set in a display region.

The cursor display unit 33 is configured to display a selection cursor at a default position in the display region, where the selection cursor is used for identifying a currently selected letter.

The input unit 34 is configured to input a letter identified by the selection cursor into a character input region according to a predetermined selection rule.

The letter sets corresponding to the arrow keys are letter sets that are respectively corresponding to the arrow keys that are obtained by classifying the 26 English letters according to the law of human graphical perception. The arrow keys include an up arrow key, a down arrow key, a left arrow key, a right arrow key and a center key.

Further, the letter sets corresponding to the arrow keys are formed through predefining, where the predefining the letter sets includes: classifying letter sets with similar features according to features of geometrical shapes of the handwritten letters, and associating the classified letter sets with the corresponding arrow keys.

Further, the classifying the letters into the letter sets with the similar features according to features of geometrical shapes of the handwritten letters and associating the classified letter sets with the corresponding arrow keys includes: classifying the handwritten letters according to the rules such as the opening direction, the arc direction, whether the letter has a top sharp point, and whether the letter is in a symmetrical shape.

Further, when the letters are classified, a corresponding classification manner is selected for each letter, and the priority principle of the classification manners is as follows: the opening direction is superior to the arc direction, the arc direction is superior to the sharp point, and the sharp point is superior to symmetry.

Further, the classifying the letters into the letter sets with the similar features according to features of geometrical shapes of the handwritten letters and associating the classified letter sets with the corresponding arrow keys further includes the following: a letter set corresponding to the up arrow key includes: f, j, t, u, v and w;

a letter set corresponding to the down arrow key includes: h, m and n;

a letter set corresponding to the left arrow key includes: a, d, g, q, y and z;

a letter set corresponding to the right arrow key includes: b, c, e, k, p and r; and a letter set corresponding to the center key includes: l, o, s and x.

Further, the display unit 32 is further configured to arrange the letter set according to a descending sequence of use efficiency of the letters, or sequentially arranged according to a sequence of the letters in the alphabet, or arranged according to a random sequence.

Figure 14:
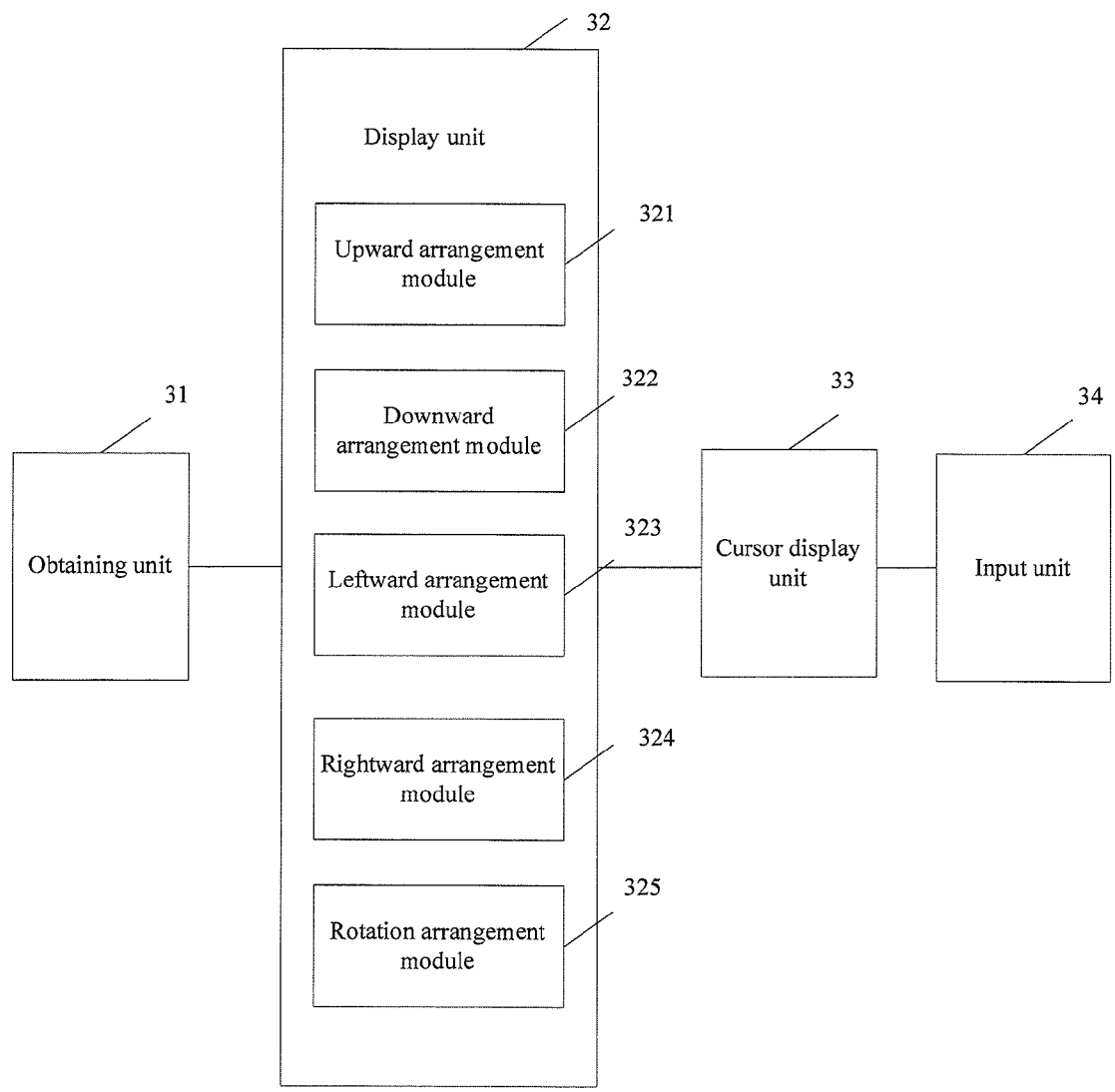
FIG. 14 is another schematic compositional diagram of a character input device based on arrow keys in Embodiment 4 of the present invention.

Further, as shown in FIG. 14, the display unit 32 includes: an upward arrangement module 321, a downward arrangement module 322, a leftward arrangement module 323, a rightward arrangement module 324, and a rotation arrangement module 325.

The upward arrangement module 321 is configured to, when the triggering of the arrow key is triggering of the up arrow key, arrange and display a letter set corresponding to the up arrow key in a direction from bottom to top, and display a selection cursor at a position of a default position.

The downward arrangement module 322 is configured to, when the triggering of the arrow key is triggering of the down arrow key, arrange and display a letter set corresponding to the down arrow key in a direction from top to bottom, and display a selection cursor at a position of a default position.

The leftward arrangement module 323 is configured to, when the triggering of the arrow key is triggering of the left arrow key, arrange and display a letter set corresponding to the left arrow key in a direction from left to right, and display a selection cursor at a position of a default position.

The rightward arrangement module 324 is configured to, when the triggering of the arrow key is triggering of the right arrow key, arrange and display a letter set corresponding to the right arrow key in a direction from right to left, and display a selection cursor at a position of a default position.

The rotation arrangement module 325 is configured to, when the triggering of the arrow key is triggering of the center key, arrange and display a letter set corresponding to the arrow key in a clockwise/counterclockwise surrounding manner, and display a selection cursor at a position of a default position.

Further, the input unit 34 is further configured to, when correspondence between or relative positions of the selection cursor and a letter remain unchanged in a specific time period, input the letter identified by the selection cursor into a character input region; or input the letter identified by the selection cursor into the character input region according to a selection instruction.

Figure 15:
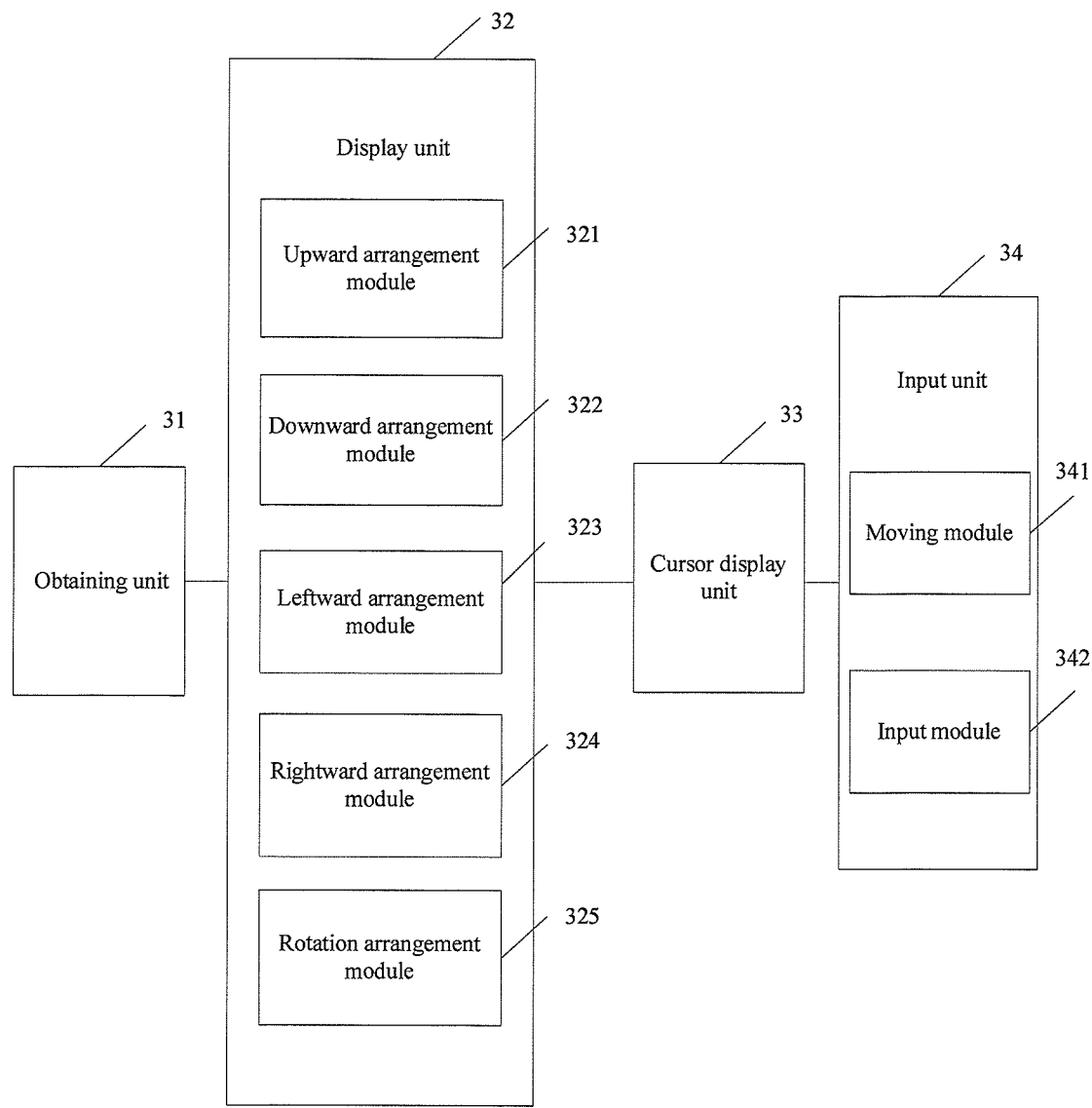
FIG. 15 is another schematic compositional diagram of a character input device based on arrow keys in Embodiment 4 of the present invention.

Further, as shown in FIG. 15, the input unit 34 includes: a moving module 341 and an input module 342.

The moving module 341 is configured to, when the triggering of the arrow key is received again in a predetermined period of time, move the selection cursor to a position of a next letter in a letter permutation according to a direction sequence corresponding to the arrow key. The moving module 341 is further configured to, when the selection cursor is located at a position of a last letter in the letter permutation, move the selection cursor to a position of a first letter in the letter permutation.

The input module 342 is configured to, when the triggering of the arrow key is not received again in a predetermined period of time, input the letter at the position of the selection cursor into the character input region.

Figure 16:
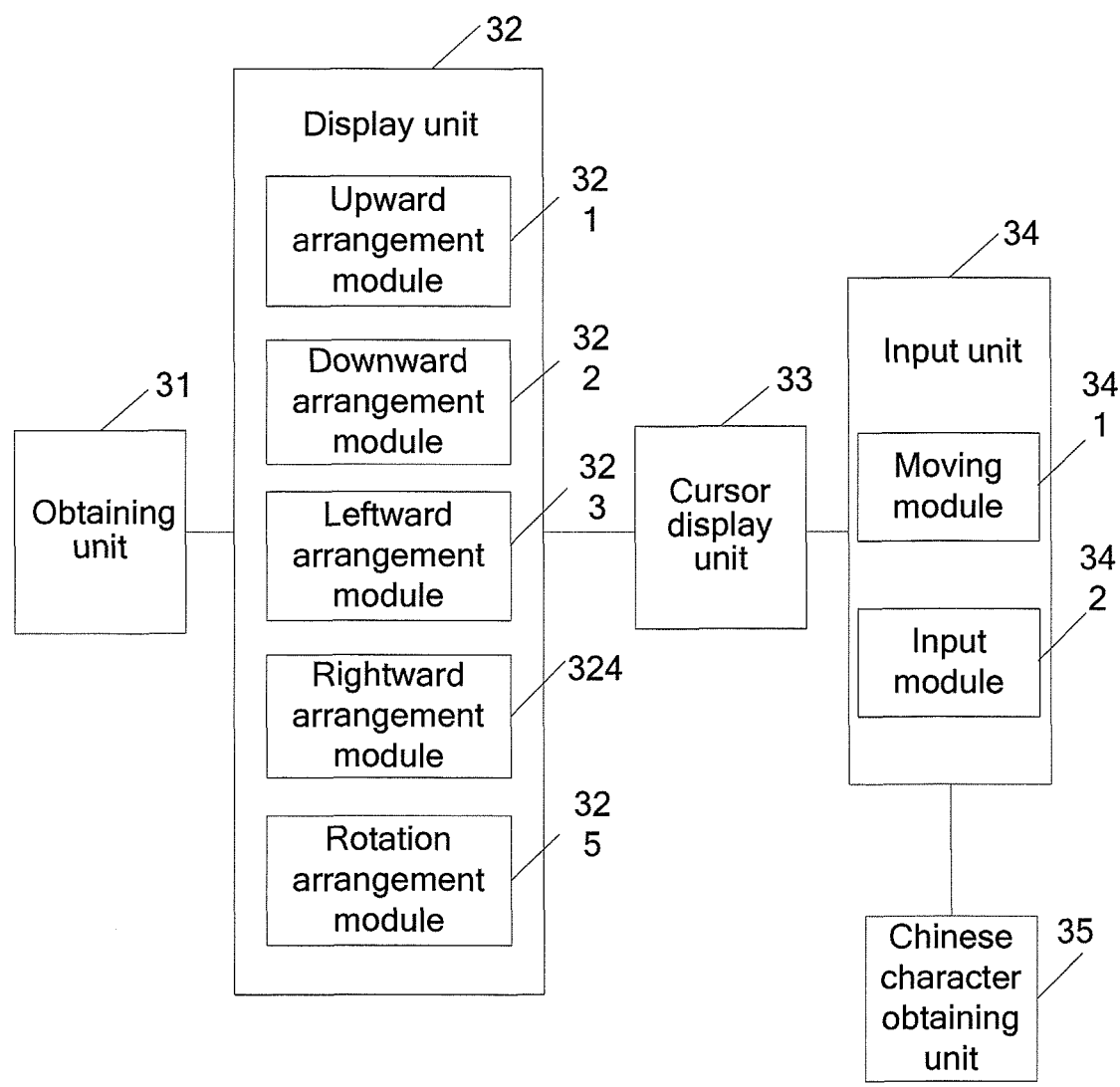
FIG. 16 is another schematic compositional diagram of a character input device based on arrow keys in Embodiment 4 of the present invention.

Further, as shown in FIG. 16, the character input device based on an arrow key further includes: a Chinese character obtaining unit 35.

The Chinese character obtaining unit 35 is configured to query a Chinese character database according to pinyin in the character input region, and obtain a Chinese character corresponding to the pinyin.

The input unit 34 is further configured to delete the letters in the character input region and input the Chinese character corresponding to the pinyin into the character input region according to selection of a user.

It should be noted that, for the description of each functional module in the embodiment of the present invention, reference may be made to the corresponding content in Embodiment 1 to Embodiment 3, which is not described in detail in the embodiment of the present invention.

Through the character input method and device based on an arrow key provided by the embodiment of the present invention, the corresponding letter sets can be drawn out according to triggering of different arrow keys. Compared with the method in the prior art that 26 letters are all displayed on the screen, a range of the letter selection is narrowed, and a moving operation of the cursor is reduced and shielding of the screen is avoided. Moreover, the letter sets are displayed in a single-line arrangement, so that the cursor only needs to be moved in one direction for letter selection without a need of performing repeated switching among multiple arrow keys or moving the cursor back and forth on a two-dimensional soft keyboard, thereby simplifying the character input operation and improving the input efficiency and user experience.

Through the above description of the implementation, it is clear to persons skilled in the art that the present invention may be implemented through software on a necessary universal hardware, and definitely may also be implemented through hardware. However, in many cases, the present invention is preferably implemented through the former method. Based on such understanding, the above technical solutions or the part that makes contributions to the prior art can be substantially embodied in the form of a software product. The computer software product may be stored in a computer readable storage medium such as a floppy disk, a hard disk, or an optical disk, and include several instructions to instruct a computer equipment (for example, a personal computer, a server, or a network equipment) to perform the method described in the embodiments of the present invention.

The above descriptions are only exemplary embodiments of the present invention, but the protection scope of the present invention is not limited thereto. Any modification, replacement readily conceivable by those skilled in the art within the technical scope disclosed in the present invention should fall within the protection scope of the present invention. Therefore, the protection scope of the present invention is subject to the protection scope of the claims.

What is claimed is:

1. A character input interface based on an arrow key, wherein
  when the character input interface is triggered through an up arrow key, a letter set corresponding to the up arrow key is arranged and displayed in a direction from bottom to top, and a letter selection cursor is displayed at a default position;
  when the character input interface is triggered through a down arrow key, a letter set corresponding to the down arrow key is arranged and displayed in a direction from top to bottom, and a letter selection cursor is displayed at a default position;
  when the character input interface is triggered through a left arrow key, a letter set corresponding to the left arrow key is arranged and displayed in a direction from left to right, and a letter selection cursor is displayed at a default position; and
  when the character input interface is triggered through a right arrow key, a letter set corresponding to the right arrow key is arranged and displayed in a direction from right to left, and a letter selection cursor is displayed at a default position.

2. The character input interface based on an arrow key according to claim 1, wherein:
  when the character input interface is triggered through a center key, a letter set corresponding to the center key is arranged and displayed in a clockwise/counterclockwise surrounding manner, and a letter selection cursor is displayed at a default position.

3. The character input interface based on an arrow key according to claim 1, wherein:
  a letter set corresponding to the up arrow key comprises: f, j, t, u, v and w;
  a letter set corresponding to the down arrow key comprises: h, m and n;
  a letter set corresponding to the left arrow key comprises: a, d, g, q, y and z;
  a letter set corresponding to the right arrow key comprises: b, c, e, k, p and r; and
  a letter set corresponding to the center key comprises: l, o, s and x.

4. The character input interface based on an arrow key according to claim 1, wherein:
  the letter sets corresponding to the up arrow key, the down arrow key, the left arrow key, the right arrow key and the center key are arranged according to a descending sequence of use efficiency of the letters, or sequentially arranged according to a sequence of the letters in the alphabet, or arranged according to a random sequence.

5. A character input device based on an arrow key, the device comprising:
  an obtaining unit, configured to query a letter database according to triggering of an arrow key and obtain a letter set corresponding to the arrow key;
  a display unit, configured to arrange the letter set corresponding to the arrow key according to a predetermined rule, and partially or fully spread and then display the letter set in a display region;
  a cursor display unit, configured to display a selection cursor at a default position in the display region, wherein the selection cursor is used for identifying a currently selected letter; and
  an input unit, configured to input a letter identified by the selection cursor into a character input region according to a predetermined selection rule.

6. The character input device based on an arrow key according to claim 5, wherein the letter sets corresponding to the arrow keys are formed through predefining, and predefining the letter sets comprises: classifying letter sets with similar features according to features of geometrical shapes of handwritten letters, and associating the classified letter sets with the corresponding arrow keys.

7. The character input device based on an arrow key according to claim 6, wherein classifying the letters into the letter sets with the similar features according to the features of the geometrical shapes of the handwritten letters and associating the classified letter sets with the corresponding arrow keys comprises:
  classifying handwritten letters according to rules such as the opening direction, the arc direction, whether the letter has a top sharp point, and whether the letter is in a symmetrical shape.

8. The character input device based on an arrow key according to claim 7, wherein a priority principle, for classifying the handwritten letters according to the rules such as the opening direction, the arc direction, whether the letter has a top sharp point, and whether the letter is in a symmetrical shape, comprises: the opening direction is superior to the arc directions, the arc direction is superior to the sharp point, and the sharp point is superior to symmetry.

9. The character input device based on an arrow key according to claim 8, wherein classifying letters into the letter sets with the similar features according to the features of the geometrical shapes of the handwritten letters and associating the classified letter sets with the corresponding arrow keys further comprises:
  classifying f, i, j, t, u, v and w into one letter set, and associating the letter set with an up arrow key;
  classifying h, m and n into one letter set, and associating the letter set with a down arrow key;
  classifying a, d, g, q, y and z into one letter set, and associating the letter set with a left arrow key;
  classifying b, c, e, k, p and r into one letter set, and associating the letter set with a right arrow key; and
  classifying l, o, s and x into one letter set, and associating the letter set with a center key.

10. The character input device based on an arrow key according to claim 5, wherein the display unit is further configured to: arrange the letter set according to a descending sequence of use efficiency of the letters, a sequence of the letters in the alphabet, or a random sequence.

11. The character input device based on an arrow key according to claim 5, wherein the display unit comprises:
  an upward arrangement module, configured to, when the triggering of the arrow key is triggering of an up arrow key, arrange and display a letter set corresponding to the up arrow key in a direction from bottom to top in a display region;
  a downward arrangement module, configured to, when the triggering of the arrow key is triggering of a down arrow key, arrange and display a letter set corresponding to the down arrow key in a direction from top to bottom in the display region;

a leftward arrangement module, configured to, when the triggering of the arrow key is triggering of a left arrow key, arrange and display a letter set corresponding to the left arrow key in a direction from left to right in the display region;

a rightward arrangement module, configured to, when the triggering of the arrow key is triggering of a right arrow key, arrange and display a letter set corresponding to the right arrow key in a direction from right to left in the display region; and a rotation arrangement module, configured to, when the triggering of the arrow key is triggering of a center arrow key, arrange and display a letter set corresponding to the center key in a clockwise/counterclockwise surrounding manner in the display region.

12. The character input device based on an arrow key according to claim 5, wherein the input unit is further configured to, when correspondence between or relative positions of the selection cursor and a letter identified by the selection cursor remain unchanged in a specific time period, input the letter identified by the selection cursor into a character input region; or input the letter identified by the selection cursor according to a selection instruction into the character input region.

13. The character input device based on an arrow key according to claim 5, wherein the input unit comprises:

a moving module, configured to, when the triggering of the arrow key is received again in a predetermined period of time, move the selection cursor to a position of a next letter in a letter permutation according to a direction sequence corresponding to the arrow key; and an input module, configured to, when the triggering of the arrow key is not received again in a predetermined period of time, input the letter at the position of the selection cursor into the character input region.

14. The character input device based on an arrow key according to claim 13, wherein the moving module is further configured to, when the selection cursor is located at a position of a last letter in the letter permutation, move the selection cursor to a position of a first letter in the letter permutation.

15. The character input device based on an arrow key according to claim 5, further comprising:

a Chinese character obtaining unit, configured to query a Chinese character database according to pinyin in the character input region, and obtain a Chinese character corresponding to the pinyin; and the input unit is further configured to delete the letters in the character input region and input the Chinese character corresponding to the pinyin into the character input region according to selection of a user.

16. A character input method based on an arrow key, the method comprising:

querying a letter database according to triggering of an arrow key and obtaining a letter set corresponding to the arrow key;

arranging the letter set corresponding to the arrow key according to a predetermined rule, and partially or fully spreading and then displaying the letter set in a display region;

displaying a selection cursor at a default position in the display region, wherein the selection cursor is used for identifying a currently selected letter; and inputting the letter identified by the selection cursor into a character input region according to a predetermined selection rule.

17. The character input method based on an arrow key according to claim 16, wherein the letter sets corresponding to the arrow keys are formed through predefining, and predefining the letter sets comprises:

classifying letter sets with similar features according to features of geometrical shapes of handwritten letters; and associating the classified letter sets with the corresponding arrow keys.

18. The character input method based on an arrow key according to claim 17, wherein classifying letter sets with similar features according to features of geometrical shapes of handwritten letters comprises:

classifying handwritten letters according to rules such as the opening direction, the arc direction, whether the letter has a top sharp point, and whether the letter is in a symmetrical shape to form letter sets with the similar features.

19. The character input method based on an arrow key according to claim 18, wherein a priority sequence for classifying the handwritten letters according to the rules such as the opening direction, the arc direction, whether the letter has a top sharp point, and whether the letter is in a symmetrical shape sequentially, comprises: the opening direction is superior to the arc directions, the arc direction is superior to the sharp point, and the sharp point is superior to symmetry.

20. The character input method based on an arrow key according to claim 19, wherein classifying the letters into the letter sets with the similar features according to the features of the geometrical shapes of the handwritten letters, and associating the classified letter sets with the corresponding arrow keys comprises:

classifying f, i, j, t, u, v and w into one letter set, and associating the letter set with an up arrow key;

classifying h, m and n into one letter set, and associating the letter set with a down arrow key;

classifying a, d, g, q, y and z into one letter set, and associating the letter set with a left arrow key;

classifying b, c, e, k, p and r into one letter set, and associating the letter set with a right arrow key; and classifying l, o, s and x into one letter set, and associating the letter set with a center key.

21. The character input method based on an arrow key according to claim 16, wherein in arranging the letter set corresponding to the arrow key according to the predetermined rule, and partially or fully spreading and then displaying the letter set in the display region, the predetermined rule comprises: arranging the letter set according to a descending sequence of use efficiency of the letters, or according to a sequence of the letters in the alphabet, or according to a random sequence.

22. The character input method based on an arrow key according to claim 16, wherein arranging the letter set corresponding to the arrow key according to the predetermined rule, and partially or fully spreading and then displaying the letter set in the display region comprises:

when the triggering of the arrow key is triggering of an up arrow key, arranging and displaying a letter set corresponding to the up arrow key in a direction from bottom to top in the display region;

when the triggering of the arrow key is triggering of a down arrow key, arranging and displaying a letter set corresponding to the down arrow key in a direction from top to bottom in the display region;

when the triggering of the arrow key is triggering of a left arrow key, arranging and displaying a letter set corresponding to the left arrow key in a direction from left to right in the display region;

when the triggering of the arrow key is triggering of a right arrow key, arranging and displaying a letter set corresponding to the right arrow key in a direction from right to left in the display region; and when the triggering of the arrow key is triggering of a center arrow key, arranging and displaying a letter set corresponding to the center key in a clockwise/counter-clockwise surrounding manner in the display region.

23. The character input method based on an arrow key according to claim 16, wherein in inputting the letter identified by the selection cursor into the character input region according to the predetermined selection rule, the predetermined selection rule comprises: when correspondence between or relative positions of the selection cursor and a letter identified by the selection cursor remain unchanged in a specific time period, inputting the letter identified by the selection cursor into a character input region; or inputting the letter identified by the selection cursor into the character input region according to a selection instruction.

24. The character input method based on an arrow key according to claim 16, wherein inputting the letter identified by the selection cursor into the character input region according to the predetermined selection rule comprises:

if the triggering of the arrow key is received again in a predetermined period of time, moving the selection cursor to a position of a next letter in a letter permutation according to a direction sequence corresponding to the arrow key; and if the triggering of the arrow key is not received again in the predetermined period of time, inputting the letter at the position of the selection cursor into the character input region.

25. The character input method based on an arrow key according to claim 24, wherein moving the selection cursor to the position of the next letter according to the direction sequence corresponding to the arrow key comprises: when the selection cursor is located at a position of a last letter in the letter permutation, the next letter is a first letter in the letter permutation.

26. The character input method based on an arrow key according to claim 16, further comprising:

querying a Chinese character database according to pinyin in the character input region, and obtaining a Chinese character corresponding to the pinyin; and deleting the letters in the character input region, and inputting the Chinese character corresponding to the pinyin into the character input region according to selection of a user.

\* \* \* \* \*